United States Patent [19]

Fornell et al.

[11] 4,269,245

[45] May 26, 1981

[54] INFEED MECHANISM

[75] Inventors: Erik G. Fornell; Hans G. U. Eklund, both of Söderhamn, Sweden

[73] Assignee: Kockums Industri Aktiebolag, Sweden

[21] Appl. No.: 13,631

[22] Filed: Feb. 21, 1979

[30] Foreign Application Priority Data

Feb. 17, 1978 [SE] Sweden ............................. 7801850

[51] Int. Cl.³ .......................... B27B 1/00; B27B 31/06
[52] U.S. Cl. ................................. 144/245 A; 83/367; 83/425; 144/2 R; 144/312; 198/456
[58] Field of Search ....................... 198/434, 456, 457; 83/367, 370, 371, 364, 368, 425.1, 425.2, 425.3, 425.4, 425; 144/2 R, 3 R, 323, 326 R, 312, 242 R, 309 R, 242 A, 242 B

[56] References Cited

U.S. PATENT DOCUMENTS

| 2,399,822 | 5/1946 | Norton | 144/242 B |
|---|---|---|---|
| 3,451,522 | 6/1969 | Ahlstedt | 83/364 X |
| 3,459,246 | 8/1969 | Ohosson | 144/312 |
| 3,890,509 | 6/1975 | Maxey | 144/312 X |
| 3,970,128 | 7/1976 | Kohlberg | 144/245 A |
| 3,983,403 | 9/1976 | Dahlstrom et al. | 144/312 X |
| 4,086,496 | 4/1978 | Berry | 144/312 X |
| 4,106,538 | 8/1978 | Sigfridsson | 144/309 R |

Primary Examiner—W. D. Bray
Attorney, Agent, or Firm—Hill, Van Santen, Steadman, Chiara & Simpson

[57] ABSTRACT

A method and a mechanism for feeding waned boards to an edger comprising a cross conveyor for the boards, a measuring apparatus, a computer, and centering and side-adjustment means to enable centering and side-adjustment of the boards in dependence of the determined values to optimize the yield in the edger. Adjacent the outlet end of the cross conveyor there are provided slide planes (i.e. movable planar support surfaces on which the boards can slide or be slid) which form a part of a longitudinal infeed conveyor and which are adapted to receive the boards from the cross conveyor and to support the boards during the centering and side-adjustment. The slide planes can be lowered or removed, after the centering and side-adjustment has been carried out, in a manner to place the board on a longitudinal conveyor means of the infeed conveyor to be fed into the edger. Preferably the longitudinal conveyor means are stationary during adjustment and are then accelerated in a controlled manner.

3 Claims, 7 Drawing Figures

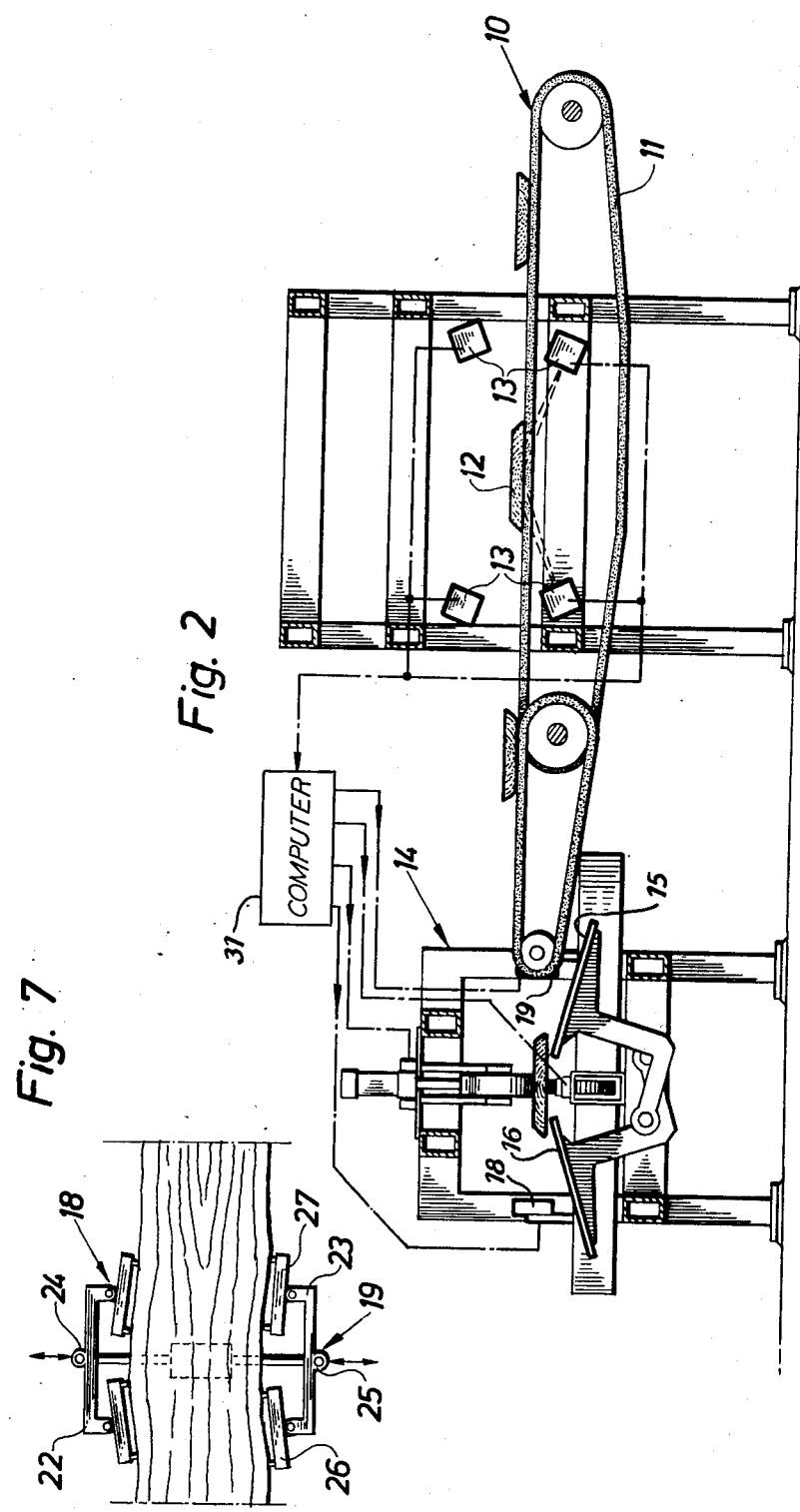

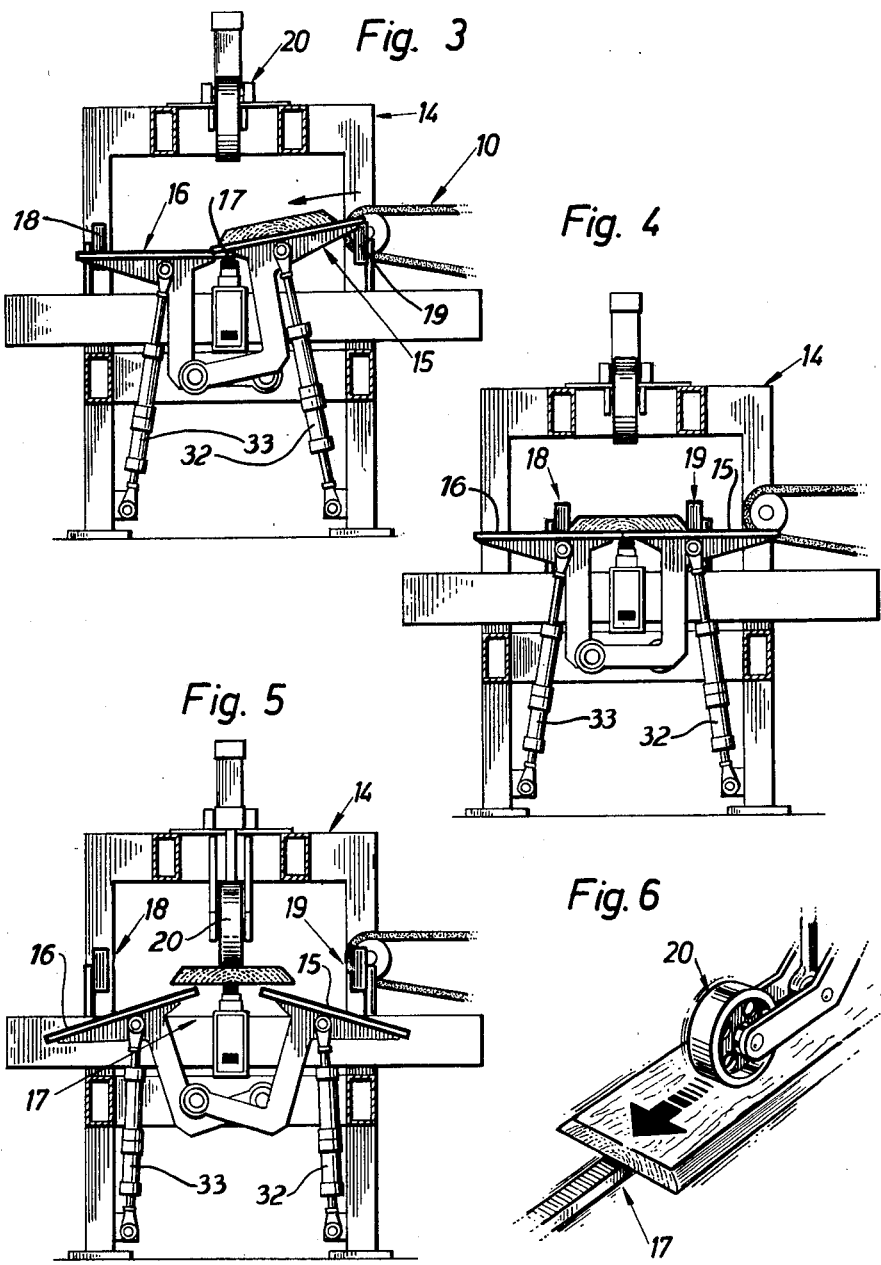

INFEED MECHANISM

BACKGROUND OF THE INVENTION

Field of the Invention

This invention relates to an infeed mechanism and more particularly to an infeed mechanism for feeding waned boards to an edger and comprising a cross conveyor, adapted to convey successive waned boards crosswise to the longitudinal axis thereof, a measuring apparatus, adapted to measure the waned boards to permit an optimizing of the yield in the edger, computer, centering and adjustment apparatus, adapted to perform centering and side-adjustment of the boards in dependence of the determined values, and an infeed conveyor adapted to feed successive boards longitudinally into the edger.

In an infeed mechanism of this type it is generally desirable that the boards should be placed very quickly and accurately on the infeed conveyor and be conveyed into the edger as soon as they have been centered and side-adjusted. Also, it is desirable that the transport of the boards longitudinally starts quickly and that their movement is accelerated to a very high degree.

SUMMARY OF THE INVENTION

The infeed mechanism is provided, adjacent to the outlet end of the cross conveyor, with slide planes which form a part of the infeed conveyor and which are adapted to receive the boards from the cross conveyor and to support the boards during the centering and side-adjustment, and is further provided with means for removal of the slide planes, as the centering and side-adjustment has been carried out, in a manner to place the board on a longitudinal conveyor means of the infeed conveyor to be fed into the edger.

For a fuller understanding of the invention reference may be had to the following description of a preferred embodiment illustrated on the accompanying drawings.

ON THE DRAWINGS

FIG. 2 is an end view of the infeed mechanism in FIG. 1, taken in the direction of the arrow A in FIG. 1;

FIGS. 3-5 illustrate a portion of the infeed mechanism of FIGS. 1 and 2 in successive steps of an infeed cycle;

FIG. 6 is a perspective view of an end of a board being fed into the edger; and

Figure 1:
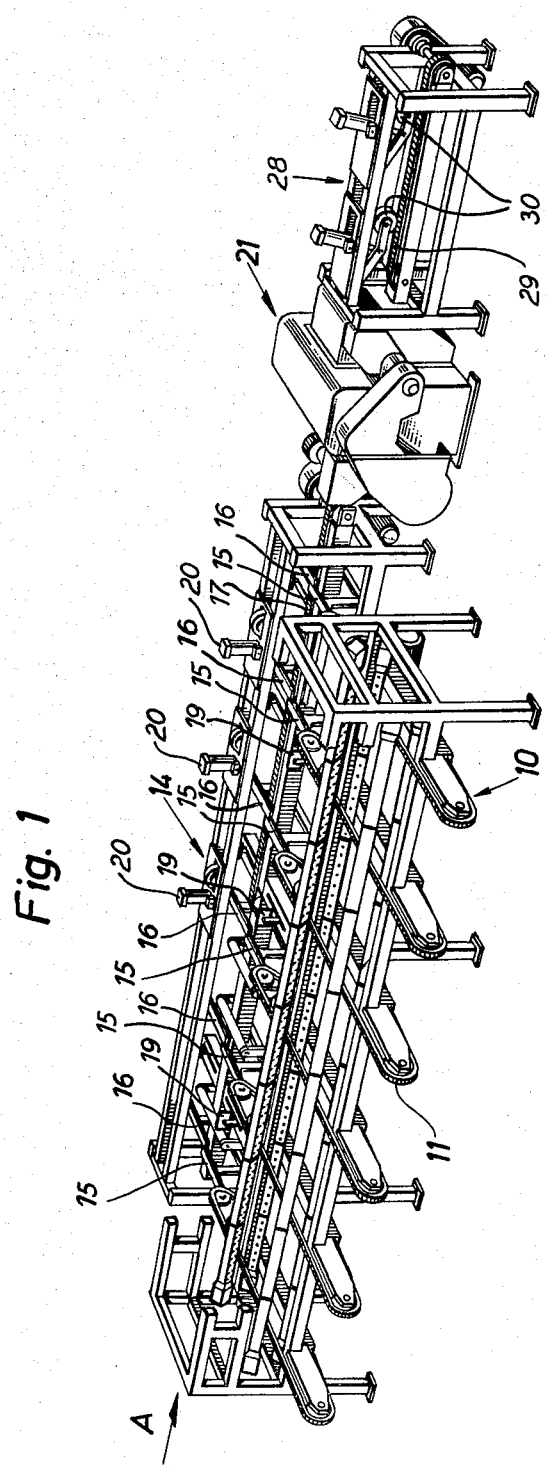
FIG. 1 is a perspective view of an infeed mechanism embodying the invention, used in connection with a conventional edger.

FIG. 7 appearing with FIG. 2 is a very simplified plan view of a centering and side-adjustment means.

AS SHOWN ON THE DRAWINGS

In FIG. 1 there is diagrammatically shown a cross conveyor, generally denoted 10, comprising six mutually parallel endless conveyor belts 11 on the uppermost portions of which waned boards are conveyed crosswise, i.e. transverse to the longitudinal direction of the boards. At the inlet and outlet ends of the cross-conveyor 10 is preferably provided with stop means (not shown) to control the board transport in such a manner that the boards are let through successively, one after the other.

During the transport cross-wise on the cross conveyor 10 each board, such as the board 12 in FIG. 2, is measured in any conventional manner at a large number of points along the length of the board, viz. by means of a diagrammatically shown measuring apparatus 13, the output of which is fed to a suitable computer 31 in order to determine the optimum yield from each board in the edger.

After being measured, the boards are moved further on to a combined centering, side-adjustment and infeed conveyor, generally denoted 14 in FIGS. 1-5. This infeed conveyor comprises slide planes, generally denoted 15 and 16, longitudinal conveyor means, generally denoted 17, centering and side-adjustment means, generally denoted 18 and 19, and biasing rollers or the like, generally denoted 20. There are six pairs of movable finger-like slide planes 15,16 shown in FIG. 1, the position of which is regulated by a fluid actuator 32,33 to facilitate sliding a board thereover when the same is received as shown in FIG. 3, for jointly providing a planar supporting surface as shown in FIG. 4 on which the board may be slid, and for being lowered or removed to thereby effect transfer of the board to the longitudinal conveyor 17 as shown in FIG. 5. The biasing rollers 20 maintain the adjusted orientation of each board as it moves over the longitudinal conveyor 17 toward and to the edger 21.

OPERATION

Following the measurement of the boards by means of the measuring apparatus 13 and an optimizing and storing of control data in the computer 31 a board 12 is fed cross-wise from the conveyor 10 down to the receiving slide planes 15 which at this moment may be held in an inclined receiving position as shown in FIG. 3 but which are shortly thereafter moved into a horizontal position, aligned with the opposite slide planes 16 as shown in FIG. 4.

Then, the board is centered and side-adjusted by means of the centering and side-adjustment means 18,19, (FIG. 4) in such a manner that an optimum yield is achieved by the edging based on and controlled by the information stored in the computer 31.

When the centering and side-adjustment has been completed, the centering and side-adjustment means 18,19, FIG. 5, are moved apart and the slide planes 15,16 are moved downwardly and sidewardly in such a manner that the board is left resting on the conveyor means 17 which is accelerated in a controlled manner to feed the board to the edger, generally denoted 21 in FIG. 1. Boards discharged from the edger 21 pass onto a receiving conveyor assembly 28 on which they are guided so as to prevent lateral displacements. The conveyor assembly 28 includes a conveyor 29 which is like the conveyor 17, and a number of biasing rollers 30 which are like the biasing rollers 20.

In FIG. 7 the centering and side-adjustment means, generally denoted 18 and 19, are shown as comprising forks 22 and 23, movable towards and away from the board and pivotally journalled on a vertical pivot pin 24 and 25, respectively. Each fork 22,23 has at its innermost leg ends either (a) jaws adapted to contact the board edges directly in response to the centering and side-adjustment motion, or (b) a pair of pivotable bogie frames 26,27 which may be provided with jaws to contact the board edges. The principle is that the contact of the centering and side-adjustment means 18,19 with the board edges, which takes place in response to control signals from the computer 31 actually may occur at a position different from that at which the actual measuring was effected; yet the contact is largely independent of possible local irregularities, such as knot protrusions on the wane or the like.

In the illustrated embodiment the centering and side-adjustment means 18,19 project upwardly from lower constructional elements. However, also a reversed construction may be used, in which case the centering and side-adjustment means 18,19 would depend from controlling and maneuvering constructional elements situated at a level above that of the boards and thus better protected against fouling.

The centering and side-adjustment means 18,19 are preferably adapted to first center the board in accordance with a program stored in the computer 31, i.e. an aligning relative to a longitudinal vertical central plane through the edger 21, for instance, and then (or simultaneously, if desired) to bring about a displacement of the centers at the board ends. Thereby a capability to turn the board is achieved at the same time as it ensured that the production may be maintained even if the measuring system should fail, viz. in that the side-adjustment in such a case may be "zeroed", either manually or automatically.

What we claim as our invention is:

1. Apparatus for feeding waned boards to an edger, comprising:
   (a) a cross-conveyor for moving the boards individually in a direction transverse to the length;
   (b) automatic means for taking measurements of the boards one at a time while on said cross-conveyor;
   (c) a computer connected to said means to store and process the measurements, and being adapted to be programmed to optimize yield;
   (d) slide planes disposed adjacent to the discharge end of said cross-conveyor for receiving individual boards therefrom and for supporting each board;
   (e) means for centering and side-adjusting each board on said slide planes, and being controlled by said computer in response to the measurements of that board;
   (f) a longitudinal conveyor disposed to received boards from said slide planes and to transfer boards to the edger;
   (g) means for lowering said slide planes to thereby transfer the board on said slide planes onto said longitudinal conveyor; and
   (h) means for maintaining the adjusted orientation of each board as it enters the edger.

2. Apparatus according to claim 1, at least one of said slide planes being raiseable to temporarily slope downwardly from the discharge end of said cross-conveyor toward another of said slide planes.

3. Apparatus according to claim 1, each one of said slide planes being pivotally supported for movement from a common plane and about an axis disposed below another slide plane.

* * * * *